United States Patent
Köhlmoos

(10) Patent No.: US 7,624,704 B2
(45) Date of Patent: Dec. 1, 2009

(54) FRAME ELEMENT FOR PLACEMENT ONTO AN AQUARIUM CONTAINER

(75) Inventor: Gerd Köhlmoos, Rosengarten (DE)

(73) Assignee: Juwel Aquarium GmbH & Co. KG, Rotenburg/Wümme (DE)

( * ) Notice: Subject to any disclaimer, the term of this patent is extended or adjusted under 35 U.S.C. 154(b) by 0 days.

(21) Appl. No.: 11/198,977

(22) Filed: Aug. 8, 2005

(65) Prior Publication Data

US 2006/0070581 A1    Apr. 6, 2006

(30) Foreign Application Priority Data

Jun. 10, 2004    (EP) .................. 04023840

(51) Int. Cl.
*A01K 63/00* (2006.01)
(52) U.S. Cl. ...................... 119/269
(58) Field of Classification Search ........... 119/245, 119/246, 247, 416, 265, 269; D30/107, 106
See application file for complete search history.

(56) References Cited

U.S. PATENT DOCUMENTS

| | | | | |
|---|---|---|---|---|
| 3,018,758 A | * | 1/1962 | Arnould ................. | 119/265 |
| 3,721,366 A | * | 3/1973 | Battershall et al. ........ | 220/665 |
| 5,009,190 A | * | 4/1991 | Gordon ................. | 119/265 |
| 5,044,316 A | * | 9/1991 | Thomas ................. | 119/419 |
| D361,646 S | * | 8/1995 | Hashimoto ............. | D30/101 |
| 5,832,871 A | * | 11/1998 | Leis .................... | 119/269 |
| 5,924,384 A | * | 7/1999 | Deitrich et al. ......... | 119/419 |

FOREIGN PATENT DOCUMENTS

| | | |
|---|---|---|
| DE | 34 09 336 | 9/1985 |
| DE | 198 13 080 | 9/1999 |
| DE | 299 07 714 | 12/1999 |
| FR | 2 792 059 | 10/2000 |
| JP | 363301733 A  * | 12/1988 |

* cited by examiner

*Primary Examiner*—Son T. Nguyen
(74) *Attorney, Agent, or Firm*—Klaus J. Bach

(57) ABSTRACT

In a frame element for placement onto an aquarium container so as to extend around the top opening thereof, wherein the frame element includes a frame member of rectangular cross-section having at least one web which extends around the top edge area of the walls of the container so as to abut the top edges thereof, at least one transverse element extends between opposite areas of the frame member for retaining the opposite areas of the frame member and the side walls of the container.

11 Claims, 2 Drawing Sheets

FRAME ELEMENT FOR PLACEMENT ONTO AN AQUARIUM CONTAINER

BACKGROUND OF THE INVENTION

The invention relates to a frame element for placement onto an aquarium container wherein the frame element includes a frame member of angled cross-section which extends around the opening of the aquarium and a web of the frame member is disposed on the top edges of the container walls.

Such a frame element is known from DE-C-34 09 336. This frame element supports a single-or multipart aquarium cover by which the opening of the aquarium-container is covered. The frame element is also used for the mounting of lighting means for illuminating the aquarium from the top that is directing light downward into the aquarium water. Furthermore, the frame element can be used for the mounting and supporting of filters, pumps, and other accessories which complement and improve the usability and appearance of the aquarium.

The known frame element and other, similar frame elements accordingly are provided mainly for supporting covers and lighting means and accessories etc., but have no other functions regarding the aquarium container. The trend in aquariums however is toward larger and larger volume aquarium containers. The aquarium manufacturers try to maintain the basic design features for aquarium containers also for the new large-volume aquarium containers since the aquarium containers have been manufactured for some years now by manufacturing robots. It is tried to maintain the manufacturing procedures as much as possible uniform for the aquarium of all sizes for manufacturing and economical reasons.

Because of industry norms and legal requirements, furthermore, an aquarium filled with water must satisfy certain strength criteria—depending on its size and volume. An essential criteria is the bending elasticity of the front and rear side walls delimiting for example a rectangular aquarium container.

Because of the substantial forces effective on the front and rear walls and also the side walls of large aquarium containers, the maximally admissible bending limit of the walls of such an aquarium container that is the side walls and also the bottom wall which consist of a glass, is reached or even exceeded. The stability of the walls can be increased by thicker sidewalls only to a limited degree, since, on one hand, the aquarium container becomes much heavier and the material and manufacturing costs also increase. On the other hand, glass, which is an optically denser medium than water, causes an optical distortion for the observer of the content of the aquarium container resulting in annoying deformations of the fish and plants in the aquarium and the distortions increase with the thickness of the glass.

There have been attempts to increase the stability also of large-volume aquarium containers by providing reinforcement webs across the opening of the aquarium container or expensive metal frame members have been used which additionally were provided with expensive brace members which were difficult to manufacture. Metallic construction components however are prone to corrosion since they are constantly exposed to water or, respectively, the moist air in the top part of the aquarium container so that only corrosion resistant steel (stainless steel) can be used for such components. This however greatly increased the manufacturing costs for such large volume aquarium containers so that they become unattractive for the consumer.

It is therefore the object of the present invention to provide a frame element for aquarium containers with which also large volume aquarium containers can be stabilized so that their side walls are not bent beyond the normal or legal limits while the frame element remains essentially unchanged so that it can be manufactured by the automatic manufacturing equipment in the same way as smaller containers and, as a result, manufacturing costs remain reasonable. It should also be possible for such a frame element to accommodate cover elements, lighting means and other accessories that is to serve as mounting and support structure. The retaining element should be in principle independent of the selected size of the aquarium.

SUMMARY OF THE INVENTION

In a frame element for placement onto an aquarium container so as to extend around the top opening thereof, wherein the frame element includes a frame member of rectangular cross-section having at least one web which extends around the top edge area of the walls of the container so as to abut the top edges thereof, at least one transverse element extends between opposite areas of the frame member for retaining the opposite areas of the frame member and the side walls of the container.

The provision of a transverse element extending between the longitudinal side from members of the frame element provides in a simple manner for a reinforcement which has the important advantage that the large water pressure forces are accommodated in the area of the normally largest outwardly curved area of the front and rear walls of the aquarium. Bascially, however, the design of the aquarium remains unchanged so that the aquarium container may still be manufactured by the same manufacturing principles as the conventional aquarium containers. Also, the manufacturing procedures may be kept unaltered wherein the same materials are used as in the manufacture of conventional aquarium containers so that manufacturing costs do not substantially exceed the manufacturing costs for conventional aquarium containers.

In a preferred embodiment of the frame element, the transverse element is so arranged that its position can be changed in a particular desired way. This means that, dependent on the standard and legal requirements, the maximally acceptable curvature of the walls of the aquarium can be accurately adjusted depending on the volume of the aquarium container which is to be provided with the frame element. The transverse element forms practically a length-limited or length-limiting spring element.

In accordance with another advantageous embodiment of the frame element, the desired change in length is obtained by an elastic deformation of the transverse element. The elastic deformability is selected or respectively, adjusted in such a way that a certain degree of deformation of the walls of the aquarium container is permitted when the container is filled with water wherein however the standard and legal requirement are fulfilled even when the aquarium is filled to the maximum extent.

In order to fulfill all the requirements, the frame element is so selected that the transverse element is curved between the two opposite side walls between which the transverse element extends. In this way, a transverse element is provided which, in a simple but effective and genial design, provides for an expansion limit in itself and is also otherwise sufficiently elastic to permit the natural and also statically desired curvature or bending of the aquarium container walls.

In principle, the shape of the transverse element can be freely chosen as long as the advantageous properties mentioned earlier can be realized. In order to obtain the needed strength with the lowest possible weight that is with the lowest material consumption, it is advantageous if the transverse element is essentially tubular and has a rectangular cross-section. However, other tube cross-sections are suitable such as triangular, trapezoidal, multi-cornered or circular cross sections may be used.

Basically, the frame element and the transverse element can be independently manufactured and can be joined during assembly, that is, the mounting of the frame element onto the aquarium container, by cementing for example or by clip connections provided between the frame element and the transverse element. The transverse element may also be mounted to the frame element before the frame element is placed onto the aquarium container for example by welding or cementing if the materials selected for the frame element and the transverse element permit such a connection.

It is however advantageous if the transverse element is formed integrally with the frame element since in this way, material, time and costs for establishing the connection between the two elements can be saved. In this case, the frame element and the transverse element consist both of the same material.

For simple assembly, or, respectively, attachment of the frame element to the aquarium container, it is furthermore advantageous if the frame element, which has a rectangular cross-section, includes a second web which extends parallel to the first web and a leg extends between the first and the second webs so that the frame element has a U-shaped cross-section. With this U-profile, the frame element can be placed onto the aquarium container in a self-stabilizing fashion as the top edges of the container walls extend into the U-profile and the frame element is supported with its top leg portion on the top edges of the container walls. In this way, also a technically advantageous and optically pleasing top end structure is provided for the aquarium container.

Even though in connection with the description above frame elements of rectangular design have been considered for simplicity reasons wherein the side walls of the container are all planar, the frame element according to the invention is independent of the shape of the aquarium container. It is rather applicable to any type of container. The frame element according to the invention may be designed not only for a rectangular or oblong container opening but also for example for an at least partially curved container or a triangular container wherein the visible side wall may also be curved. Also, the container may be essentially circular or elliptical. In summary, it can be said that the frame element according to the invention is in principle independent of the shape of the aquarium container. If particularly large forces are present in very large-volume aquarium containers, a plurality of transverse elements may be provided and arranged at those locations of the frame element where the largest forces are expected to be effective.

As already indicated earlier, the material of which the frame element and the transverse element consist can be selected as it is considered to be suitable: Metallic material or plastic materials or combinations of metal and plastic or even compound materials such as glass fiber reinforced plastic material may be used. It is actually advantageous to manufacture the whole frame element included the transverse elements from plastic material, preferably by injection molding, since the costs for such a process are low as the whole structure can be manufactured fully automatically in a single manufacturing step including the frame and transverse elements.

In order to ensure that, particularly with frame elements manufactured frame plastic material, the water pressure forces effective on the side walls of the aquarium container are uniformly transmitted to the frame element and the transverse elements or, vice versa, the retaining forces are uniformly transmitted to the side walls of the aquarium container, it is advantageous if the frame element is attached to the container walls in a force-locking manner. This is achieved by cementing the frame element to the container walls. The cementing additionally provides a seal with respect to the water or liquid content of the aquarium container as the water cannot infiltrate, by capillary action, the gap between the frame member and the glass wall edge areas of the container on which the frame member is disposed.

The invention will be described below in greater detail on the basis of a particular embodiment with reference to the accompanying drawings.

DESCRIPTION OF A PREFERRED EMBODIMENT

Figure 1:
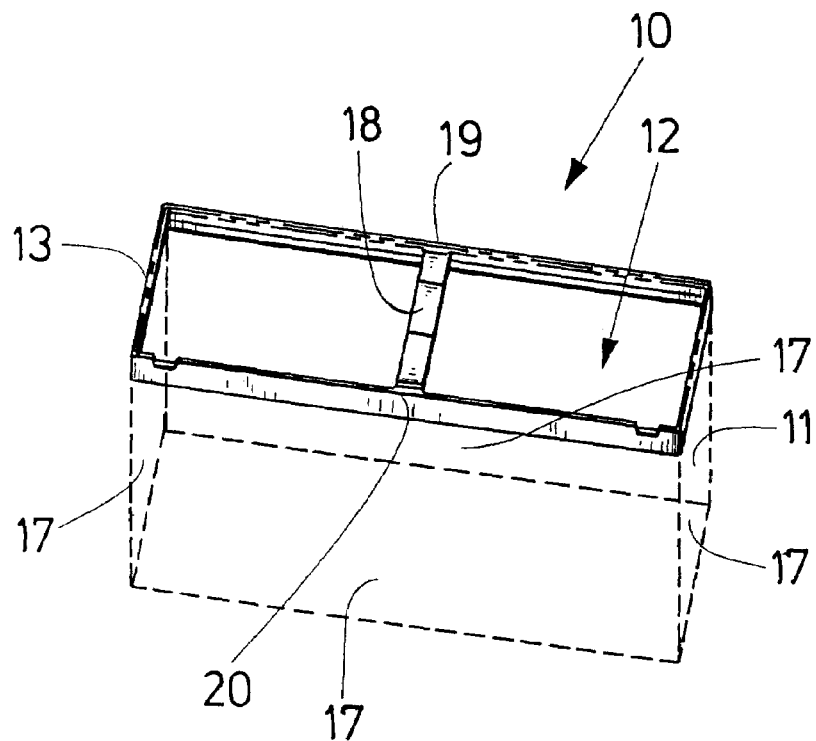
FIG. 1 is a perspective view of a cuboid aquarium container, onto which the frame element according to the invention is placed.
Figure 2:
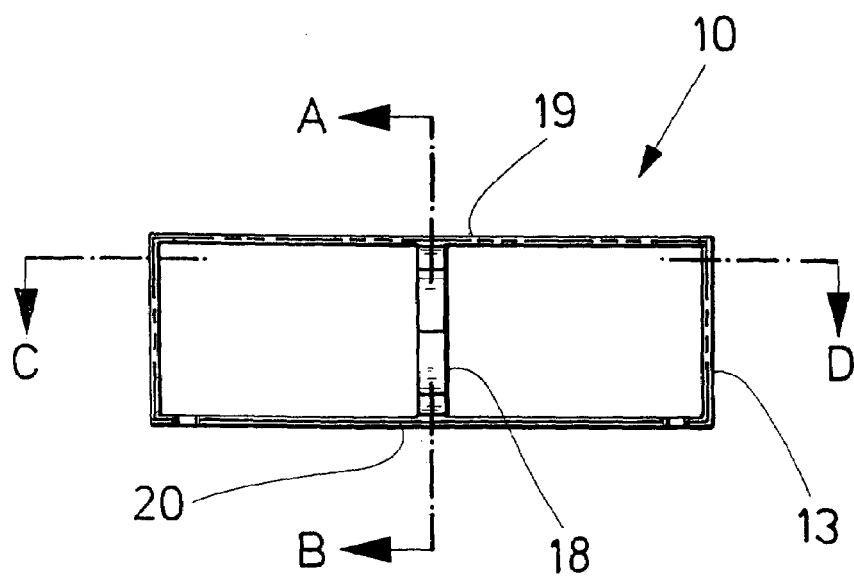
FIG. 2 is a top view of the frame element according to FIG. 1.
Figure 3:
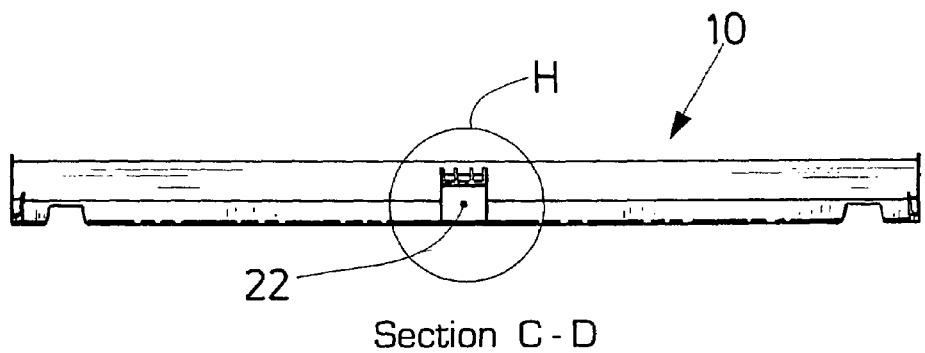
FIG. 3 is a side cross-sectional view taken along line C-D of FIG. 1 in an enlarged representation.

First reference is made to the representative of FIG. 1. An aquarium 11 consisting of glass is shown in a cuboid form by dashed lines. The aquarium container 11 includes in the embodiment described herein in accordance with FIG. 1, a rear and a front wall 17 as well as opposite side walls 17' and a bottom wall. Since such aquarium containers 11 are generally known a more detailed description of the construction of such an aquarium container 11 is not needed.

Figure 5:
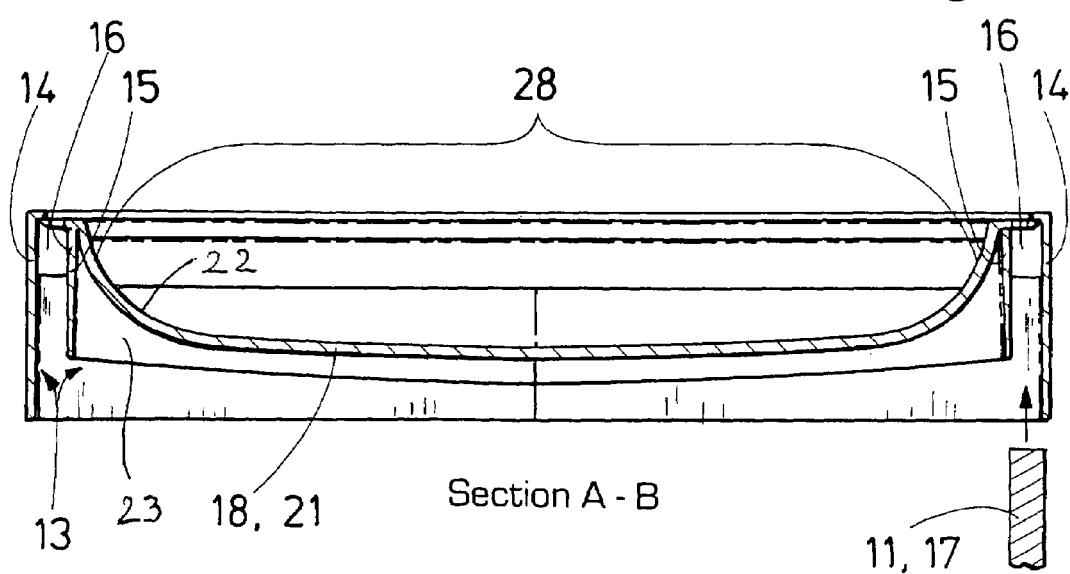
FIG. 5 is a cross-sectional view taken along the line A-B of FIG. 2 through the frame element and the transverse element which is curved downwardly.

Onto the opening 12 of the aquarium container 11, a frame element 10 is placed. The frame element 10, see also particularly the representation of FIG. 5 includes as main part a retaining frame element 10, which extends around the opening 12 and which has an essentially U-shaped cross-section. Opposite a first outer web 14 of the frame members 13, an essentially parallel second web 15 is arranged in spaced relationship. The first and second webs 14, 15 are interconnected by a leg 16 extending therebetween. The frame member 13 of U-shaped cross-section formed thereby receives between the webs 14, 15 the top edge areas of the pane-like walls of the aquarium container 11 around the opening 12 of the aquarium container 11 as shown in FIG. 5 schematically on the right where a portion of the wall 17 of the container 11 is indicated ready to be moved between the webs 14, 15 of the U-profile in the direction of the arrow.

The frame members 13 described above is essentially of conventional design so that they do not need to be described in greater detail.

Figure 4:
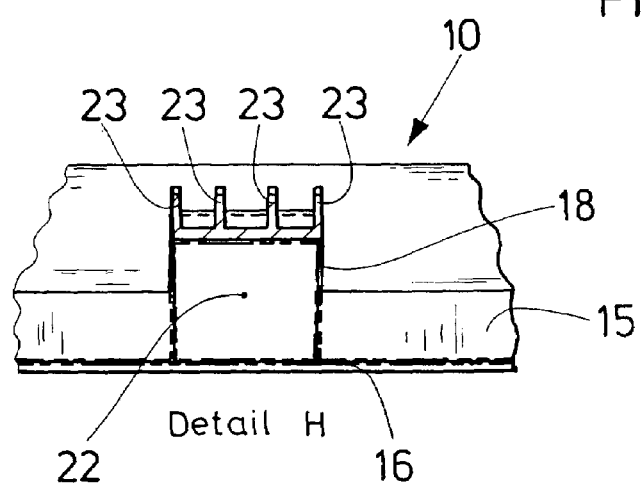
FIG. 4 is a detailed view of the area of FIG. 3 enclosed by the circle H showing the area of connection between the frame member and the transverse member in an enlarged representation.

However, the frame element 10 is provided with at least one transverse element 18 which interconnects the opposite webs of the frame member at opposite sides 19, 20. The transverse element 18 is shown in FIG. 5, which is a more detailed view to be curved in the longitudinal direction that is, it includes a downwardly curved section 21 shown in FIG. 5 in a longitudinal sectional view. The wording longitudinal sectional view refers to the position of the transverse element 18 between the essentially opposite areas 19, 20 of the frame element 10. The transverse element 18 is downwardly open that is it has a U-shaped cross-section. Tn the shown embodiment, it is essentially rectangular. The curved transverse element 18, however, may be tubular and it may also be provided with a plurality of ribs 23 forming reinforcement elements, see FIG. 4, in order to increase the longitudinal stability thereof. The reinforcement elements may also be in the form of a honeycomb structure. The lateral width of the transverse element 18 however is selected to be as small as possible but sufficient for the required stability in order to appear optically as little as possible and also to avoid casting of shadows in the aquarium container.

The curved area 21, 22 of the transverse element 18 provides for an extension range of the transverse element 18, which is limited by the stretched out length of the transverse element, that is, when the aquarium container is filled to the top with water and the largest pressure is effective on the container side walls 11. Then the transverse element 18 is stretched so as to prevent any further outward binding of the container walls. The transverse element 18 or, respectively, the curved area thereof are so designed that, when subjected to the largest possible load on the opposite side walls of the aquarium container 11 the outward bending of the walls is limited in accordance with the standards and legal requirements within the acceptable salient tolerances. The frame elements 10 and the transverse element 18 or elements 18, if several transverse elements are provided are formed essentially integrally that is they consist of a single molded part. Such a frame element 10 consists preferably of an injection moldable plastic material so that the frame element 10 with the components frame members 13 and transverse element 18 can be manufactured and handles as a single piece.

When the frame element 10 has been manufactured in the way described, it is placed onto the upper edge area of the aquarium container walls and, for a force-locking jointure the side wall portions of the aquarium container 11 which are received in the U-profiled frame members 13 are cemented to the frame members 13.

Although a rectangular aquarium container 11 is shown in the drawings, the aquarium container may have curved or partially curved wall; it may have, for example, an elliptical or circular opening so that also the frame element 10 needs to be curved.

What is claimed is:

1. A frame element in combination with an aquarium, the aquarium including side walls having upper edge areas and a top opening; the frame element including frame members extending around the top opening of the aquarium and having at least a first web which extends around the upper edge areas of the side walls so as to abut the side walls of the aquarium, and at least one transverse element extending between, and being firmly connected to, opposite areas of the frame element for retaining the opposite areas of the frame element and the respective opposite side walls of the aquarium; the frame element further comprises a second web which extends parallel to the at least first web and in spaced relationship therefrom with a leg disposed between, and interconnecting, the two spaced webs so as to provide a downwardly open U-shaped cross-section for the frame member of the frame element.

2. A frame element according to claim 1, wherein the transverse element is so shaped as to be longitudinally expandable by a predetermined amount.

3. A frame element according to claim 2, wherein the transverse element is elastically deformable to achieve the longitudinal extension thereof.

4. A frame element according to claim 1, wherein the transverse element is longitudinally curved between the opposite areas of the frame element.

5. A frame element according to claim 4, wherein the curved area of the transverse element defines the maximum stretched length of the transverse element.

6. A frame element according to claim 4, wherein the transverse element has a rectangular cross-section.

7. A frame element according to claim 1, wherein the frame members and the transverse element are formed as a single piece.

8. A frame element according to claim 1, wherein the frame member is sized so as to receive the top edge areas of the side walls of the aquarium between the first and the second webs.

9. A frame element according to claim 1, wherein at least one of the frame member and the transverse element consist of an injection molded plastic material.

10. A frame element according to claim 1, wherein the frame member is connected to the aquarium in a force-locking manner.

11. A frame element according to claim 1, wherein the frame member is cemented to the aquarium container.

* * * * *